| (12) | United States Patent | (10) Patent No.: | US 9,222,956 B2 |
|---|---|---|---|
| | Bullard | (45) Date of Patent: | Dec. 29, 2015 |

(54) HIGH BANDWIDTH LINEAR FLEXURE BEARING

(71) Applicant: Raytheon Company, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 93 days.

(21) Appl. No.: 14/091,194

(22) Filed: Nov. 26, 2013

(65) Prior Publication Data

US 2015/0144764 A1    May 28, 2015

(51) Int. Cl.
```
F16M 13/00        (2006.01)
G01P 1/00         (2006.01)
G01P 1/02         (2006.01)
G01D 11/30        (2006.01)
G12B 9/00         (2006.01)
```

(52) U.S. Cl.
CPC ............... *G01P 1/003* (2013.01); *G01D 11/30* (2013.01); *G01P 1/023* (2013.01); *G12B 9/00* (2013.01)

(58) Field of Classification Search
CPC ........................................................ G01P 1/003
USPC ................................................................ 248/618
See application file for complete search history.

(56) References Cited

U.S. PATENT DOCUMENTS

```
3,672,231  A  *   6/1972  Shinn et al. ............... 73/514.02
4,706,374  A  *  11/1987  Murakami .................... 438/52
4,882,933  A  *  11/1989  Petersen et al. ........... 73/514.13
5,165,279  A  *  11/1992  Norling et al. ............ 73/514.14
5,369,996  A  *  12/1994  Christen et al. .......... 73/514.29
5,594,170  A  *   1/1997  Peters ....................... 73/514.29
5,644,083  A  *   7/1997  Newell et al. ............. 73/514.29
6,263,735  B1 *   7/2001  Nakatani et al. .......... 73/514.36
7,117,724  B1 *  10/2006  Goodberlet et al. .......... 73/105
2006/0254375  A1     11/2006  Shoji
2008/0229566  A1 *    9/2008  Saito ........................... 29/25.35
2010/0212426  A1      8/2010  Oshio
2012/0304769  A1     12/2012  Watanabe et al.
```

FOREIGN PATENT DOCUMENTS

EP         1 394 554 A1    3/2004

OTHER PUBLICATIONS

Notification of Transmittal of the International Search Report and the Written Opinion of the International Searching Authority, or the Declaration dated Jan. 13, 2015 in connection with International Patent Application No. PCT/US2014/057495.

\* cited by examiner

*Primary Examiner* — Mark Wendell (57) ABSTRACT

A system and a method are disclosed for a high bandwidth linear flexure bearing, which may be particularly useful in high end accelerometers and high-precision linear servo mechanisms. Certain embodiments may apply to sensors that measure motion in one dimension. Such embodiments may substantially improve the off-axis performance of the sensors providing ultra-repeatability while maintaining linearity of motion and linearity in spring rate Some embodiments use spring flexures and flex-couplers to support the sensor stage and connect it to the reference base. Several embodiments are disclosed that may fit the needs of specific applications in the area of high-end servos and accelerometers.

26 Claims, 9 Drawing Sheets

HIGH BANDWIDTH LINEAR FLEXURE BEARING

TECHNICAL FIELD

The present disclosure is directed in general to the field of high performance precision motion sensors requiring high bandwidth and linear spring characteristics and more particularly to a high bandwidth linear flexure bearing. Such sensors are typically used in high performance Inertial Measurement Units and in high-bandwidth ultra-precise linear motion servo mechanisms.

BACKGROUND OF THE DISCLOSURE

There are many applications of precision motion sensors, and in particular, the field of accelerometers and servos depend heavily on the accuracy and high bandwidth capability of these sensing devices. Linearity of motion of the moving stage and linearity of spring rates are two important characteristics that influence performance. The performance along the direction of sensing is often called on-axis performance and the degradation in performance due to forces along directions other than the direction of sensing is called off-axis or cross-axis contamination.

A sensor is usually mounted on a stage that moves relative to a stationary base. The moving stage is suspended through some linear bearing or linear movement flexure arrangement from the base so as to provide the degree of freedom the stage requires for sensing while blocking or restraining the stage from moving in other off-axis directions. Attempts at trying to improve the on-axis performance typically suffer from off-axis (or cross-axis) contaminations in the process. They also suffer from non-linearity in stage movement and/or in the spring rate. Servo bandwidth gets limited at higher frequencies due to higher order structural resonance modes containing off-axis motion components. Ideally a linear flexure bearing has finite stiffness in the direction of desired motion and infinite stiffness in all other (off-axis) degrees of freedom.

These issues become much more predominant in the high end sensors, such as strategic grade Inertial Measurement Units (IMUs) and in high-bandwidth, ultra-precise linear servo mechanisms. The system needs to address the off-axis contamination and non-linearity issues while trying to improve the precision in the direction of sensing. The performance of the IMUs and that of the high end servo mechanisms that exist today suffer from the significant presence of higher order modes and lowering of the mode frequencies as well as non-linearity caused by stiffness and other factors leading to poor off-axis performance and lower effective usable bandwidth.

SUMMARY OF THE DISCLOSURE

To address these deficiencies and to improve the performance of sensors in this field of ultra-high performance accelerometers and servo mechanisms, the embodiments disclosed herein provide a system and method for a high performance linear flexure bearing. Several embodiments are disclosed herein.

The embodiments herein disclose a high performance motion sensing system and a method of making the same. These embodiments are typically used in a high resolution accelerometer or in an ultra-precise linear servo mechanism. A particular embodiment of the disclosure comprises a stage for mounting a sensor, that can move in a direction of sensing, a sensor body that is fixed and serving as a reference base for the sensor, two or more spring flexures that connects the stage to the body, each of the spring flexures having a center portion. One or more flex coupler connect the center portions of a pair of the spring flexures so as to restrain off-axis movements of the stage while providing for a linear motion along the direction of sensing.

According to particular embodiments, the spring flexures have linear characteristics much like a linear spring. The flex couplers also have linear characteristics and one of the functions of the flex couplers is to restrict the relative movements of spring flexures by physically connecting the two spring flexures that connect the stage to the body of the sensor.

According to a particular embodiment, U shaped spring flexures and U shaped flex couplers with a rectangular shaped stage are utilized. Other embodiments may also use Z or I shaped flexures.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale and are often sketches used to explain the concepts.

In the fields of high end accelerometers and high fidelity servo mechanisms, there is a need for high bandwidth flexure bearings that provide ultra-repeatability and linearity in motion and spring rates. Such needs exist in other applications as well, where sensing of motion in one dimension at high resolutions drives the ultimate system performance. Existing systems and methods suffer from off-axis contaminations and suffer from the presence of strong higher order modes that affect the effective bandwidth of operation of these sensors. Certain embodiments of the disclosure solve this problem through a system and method for a high bandwidth flexure bearing that provides for ultra-repeatability and increased bandwidth of operation.

In most applications, the sensors that measure motion in one dimension are often subjected to off-axis forces and movements and their impact on sensitivity and linearity have limited their bandwidth of operation in the direction of motion the sensors are operating. Various designs try to address different aspects of the problem and the disclosed embodiments herein offer a viable and inexpensive solution.

Figure 1:
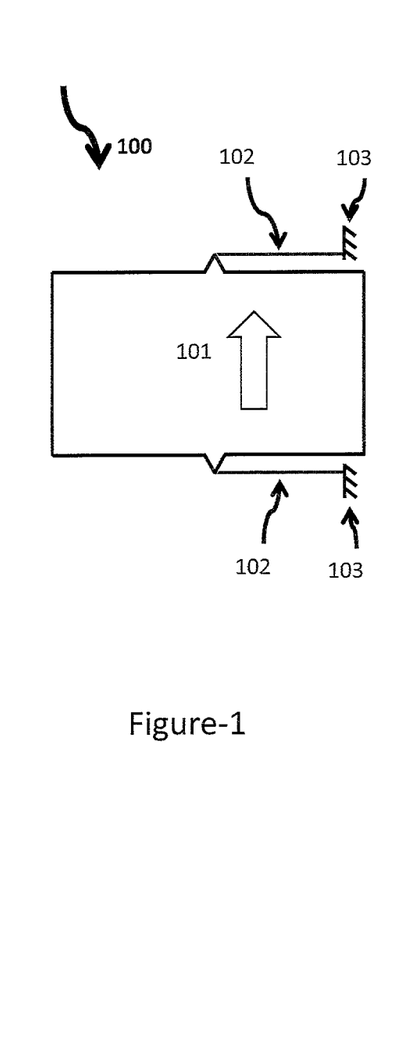
FIG. 1 illustrates a sensor that is mounted on a stage and the stage being connected to the reference base using two blades.

FIG. 1 illustrates a system 100 where the stage 101 to which the sensor (not shown) is mounted is connected to the fixed reference base 103 via two blades 102 as shown. Sensors of various types are mounted on the stage 101. The direction of motion that is sensed is up and down (as shown by the arrow) and the off-axis forces can be rotational or sideways or perpendicular to the page. Although the spring rate is linear, the blades move the stage (thereby the sensor) in an arc like fashion, making the movement non-linear.

Figure 2:
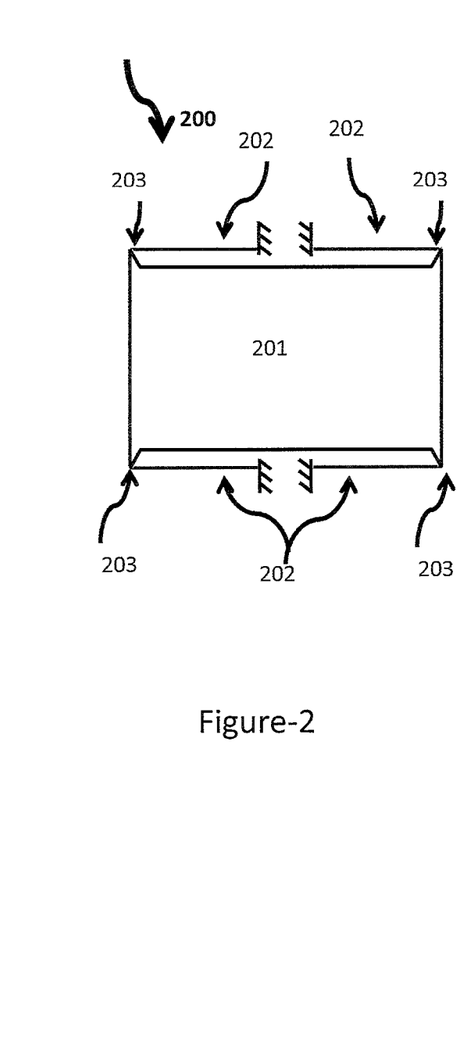
FIG. 2 illustrates a sensor that is mounted on a stage and the stage being connected to the reference base using four blades.

FIG. 2 illustrates an improved system 200 where the sensor mounted stage 201 is suspended by four blades 202 from the fixed base 203. This embodiment provides for a linear movement in the direction of sensing, but ends up with a non-linear spring rate due to the structural limitations on travel.

Figure 3:
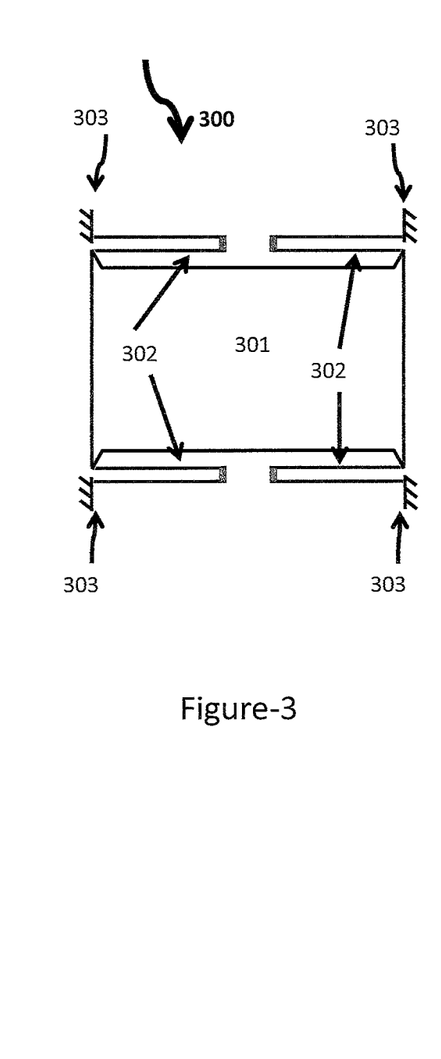
FIG. 3 illustrates a sensor that is mounted on a stage and the stage being connected to the reference base using four U shaped spring flexures.

FIG. 3 illustrates a further improved system 300, where the sensor stage is suspended by four U shaped flexures 302 from the fixed reference base 303. This mechanism provides for a linear movement as well as linear spring rates. This is a substantial improvement over the systems 100 and 200, but still suffers from some off-axis stiffness that limits the servo bandwidth. For most servo mechanisms, the approach shown in system 300 may provide adequate servo bandwidth, but for applications such as strategic grade Inertial Measurement Units (IMUS) or that of ultra-precise linear servos, the operational spring bandwidth is not adequate.

Figure 4:
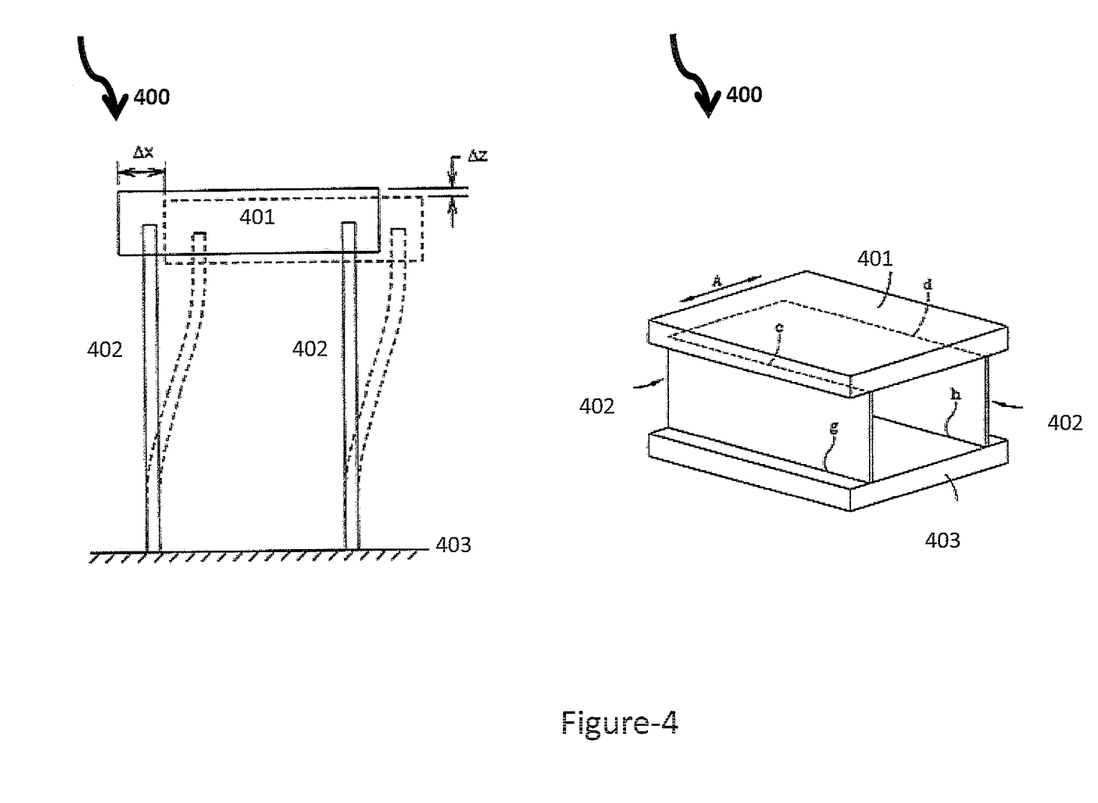
FIG. 4 illustrates a sensor mounted on a stage that is connected to a reference base through rectangular blades, the base being parallel to the stage.

FIG. 4 illustrates the limitations of a two blade system. The elevation view and isometric view of the system 400 show the stage or sensor platform 401 being supported by two blades 402 and connected to the fixed reference base 403. Direction A is the direction of sensing and $\Delta X$ is the displacement the sensor is measuring. Because of the arc shaped movement of the blades, there is an off-axis corruption $\Delta Z$ due to a non-linear displacement for the sensor.

Figure 5:
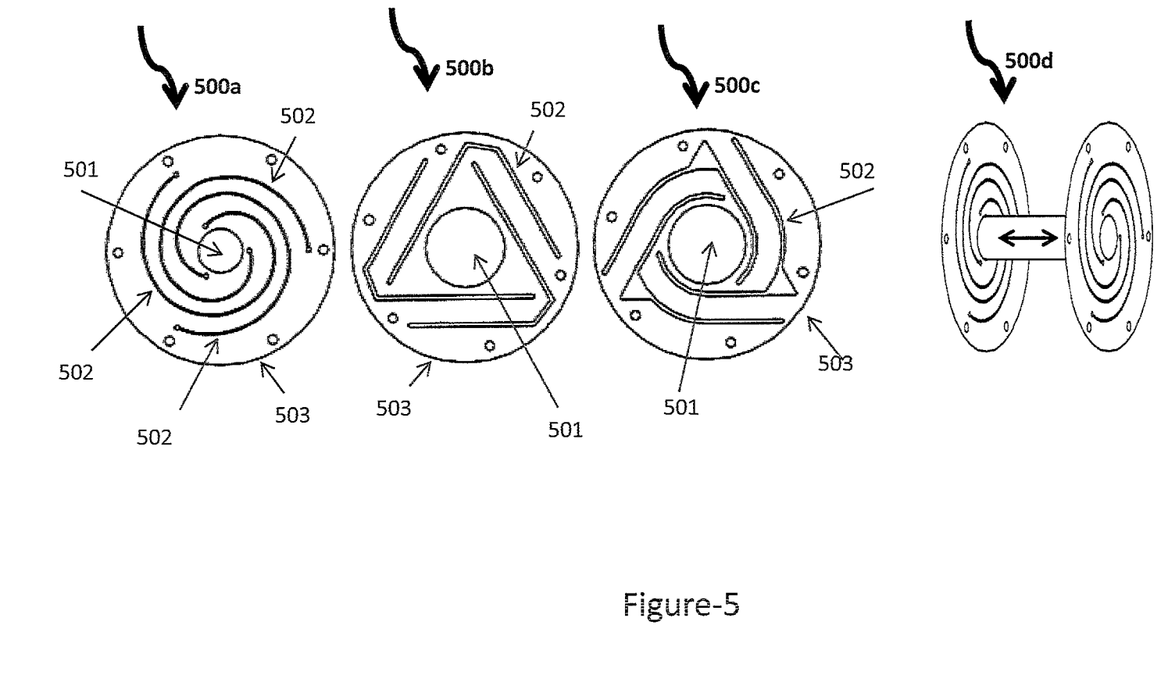
FIG. 5 illustrates a three linear stage flexure bearings where the center moves in and out of plane while the perimeter remains fixed.

FIG. 5 illustrates another embodiment of a sensor subjected to linear motion. This figure shows three different spring mechanizations 500a, 500b and 500c that are used in stacks of 2 or more with some separation between their planes as shown in 500d. Here, the desired motion is as indicated in 500d, a linear motion in and out of page of the sensor stage 501 but undesired non-linear rotational movements occur as a by-product. The system of springs 502 that connect the sensor platform to the base 503 try to limit this error, but this off-axis rotational corruption limits the effective bandwidth of operation.

Figure 6A:
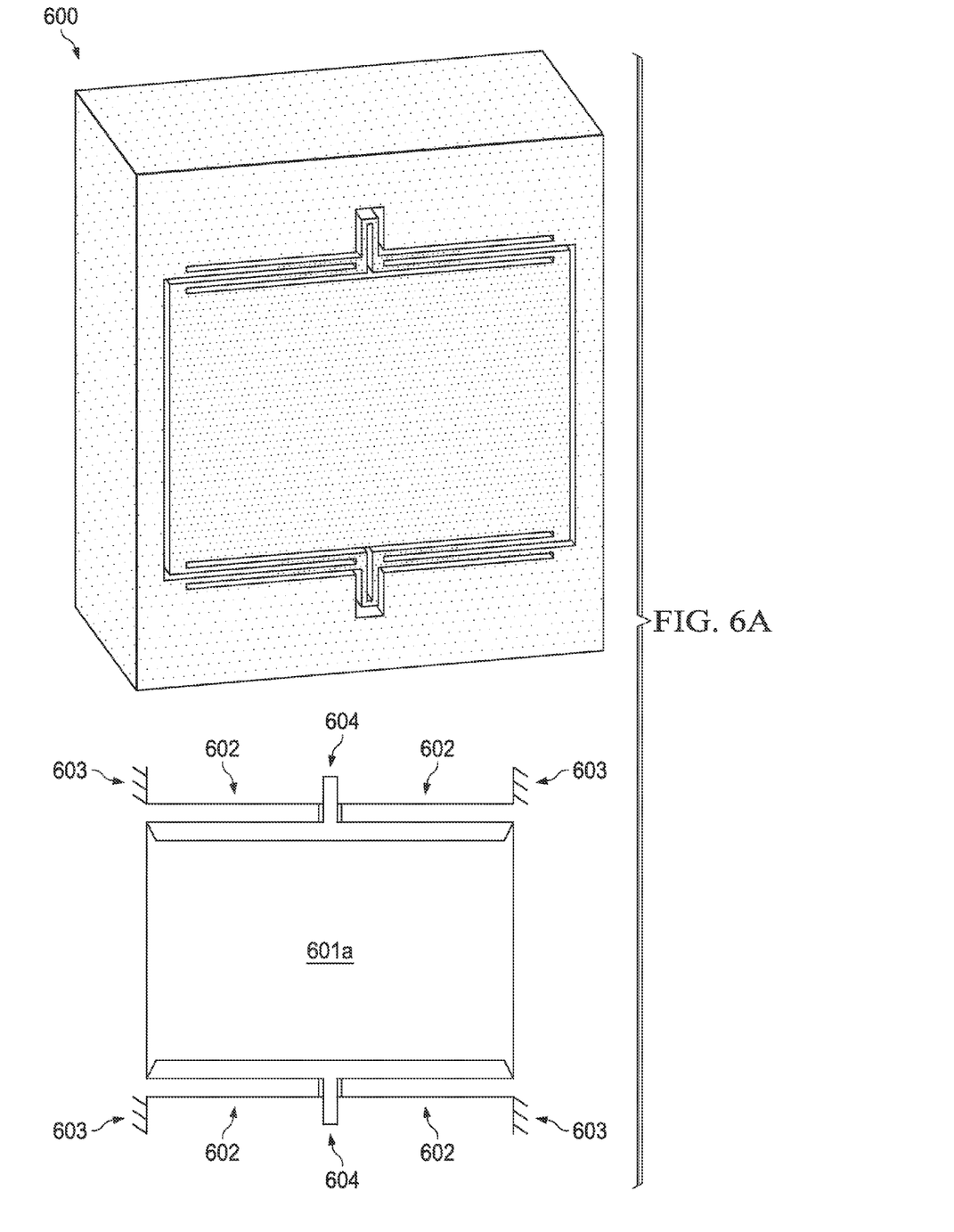
FIGS. 6A and 6B illustrate an embodiment of the disclosure where U shaped flex couplers are used in conjunction with the U shaped spring flexures to provide off-axis stiffness while allowing unconstrained linear motion in the direction of sensing.
Figure 6B:
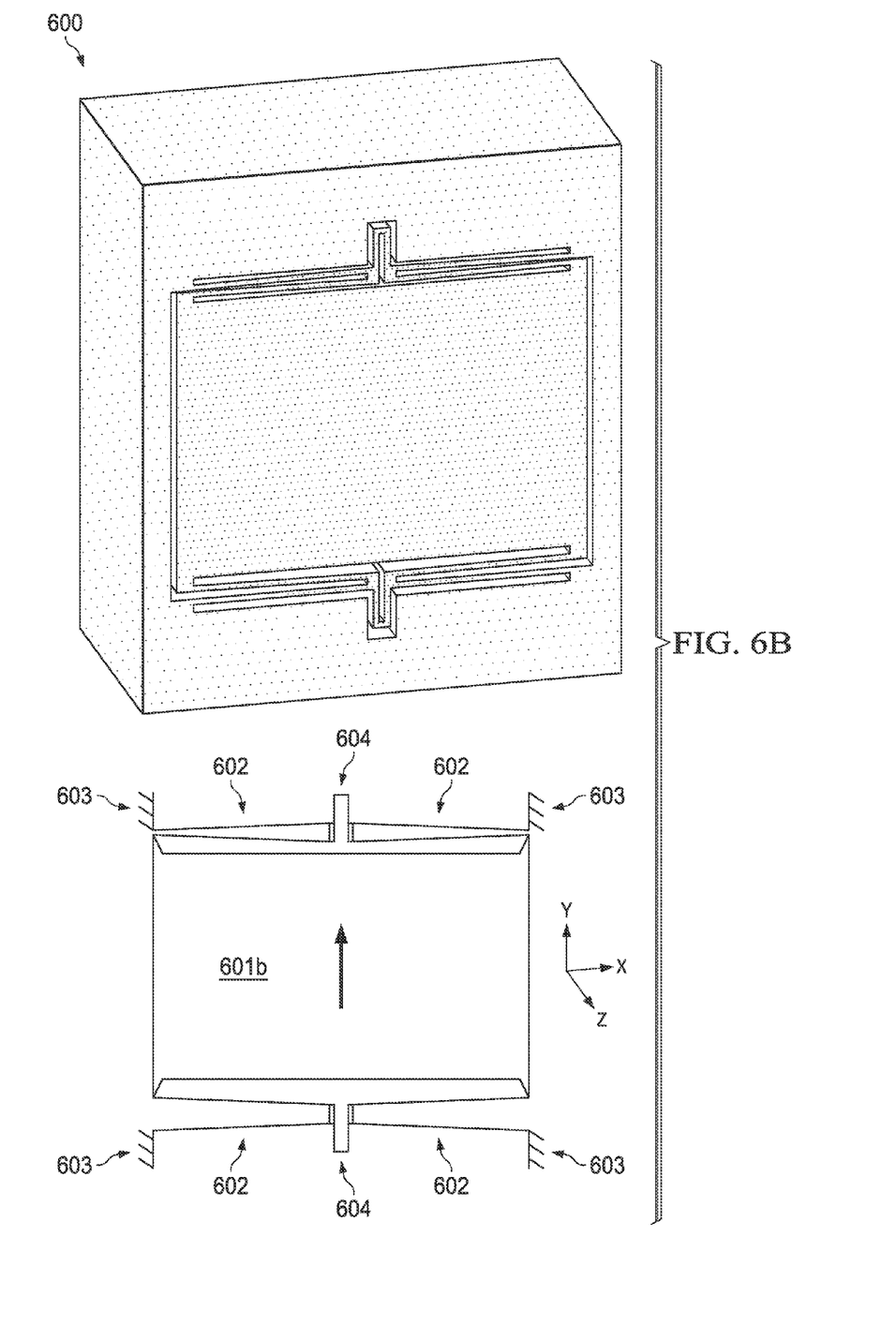

FIGS. 6A and 6B illustrate a system 600, according to an embodiment of the disclosure. With reference to FIG. 6B, the sensor (not shown) is mounted on the stage 601. Four spring flexures 602 support the sensor stage 601 and connect the stage 601 to the fixed sensor base 603. The U shaped spring flexures 602 have a center portion where a U shaped flex coupler 604 connects. The two ends of the U shaped flex coupler 604 connects to the two center portions of the two U shaped spring flexures 602—one on each side as illustrated. Another U shaped flex coupler 604 does a similar connection at the bottom side. The presence of flex couplers 604a and the way they are connecting the spring flexures 602 substantially improves the linear performance in the direction of sensing and provides substantial stiffening of higher order (off-axis) modes.

With reference to FIG. 6B, the system 600 is shown in action. As shown, the Y-axis represents the direction of sensing. The X and Z axis represent the directions of off-axis forces. As represented, the sensor stage 601 is displaced in the direction of Y and the U shaped spring flexures 604 provide for linear displacement in the direction of sensing by compressing the tips in the top and by expanding the separation of the tips of the spring flexures at the bottom with a linear response to the force along the direction of sensing. The flex couplers 604 in the top and bottom do the job of controlling the off-axis movements due to off-axis forces while not impeding free movements in the direction Y of sensing. Since the flex coupler connects the two Spring flexures—one on each side, they constrain the off axis movements of these spring flexures. The isometric view is illustrated in the top showing the flex couplers in action.

Figure 7:
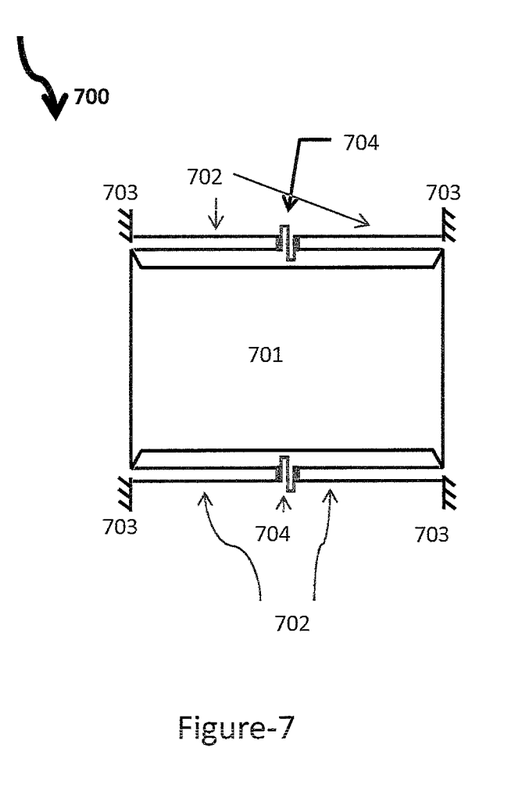
FIG. 7 illustrates another embodiment of the disclosure where a Z shaped flex coupler is used in conjunction with U shaped spring flexures to provide a minimal off-axis contamination while allowing unconstrained linear motion in the direction of sensing.

FIG. 7 illustrates another system 700, according to an embodiment of the disclosure. In the system 700 of FIG. 7, a Z shaped flex coupler 704 connects the two center portions of the U flexures 702, and they together support the sensor stage 701 and connect it to the fixed platform base 703. These Z shaped flex couplers do a similar job as flex couplers 604 illustrated earlier in containing the off-axis corruption and improving the operational sensor bandwidth.

Figure 8:
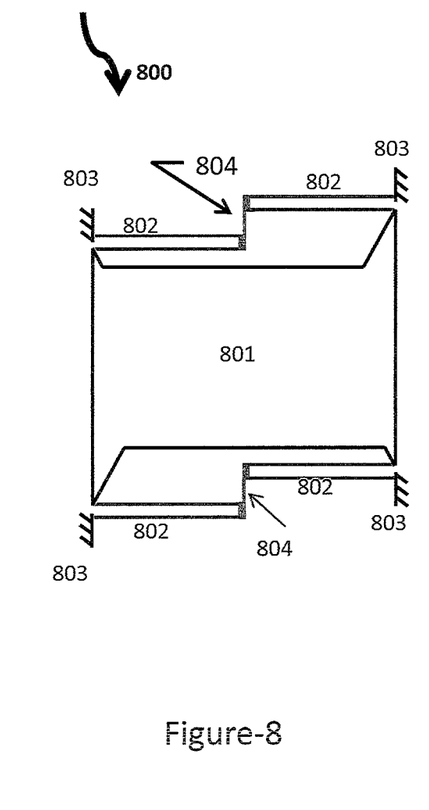
FIG. 8 illustrates yet another embodiment of the disclosure using I shaped flex couplers.

FIG. 8 illustrates yet another system 800, according to an embodiment of the disclosure. As shown in FIG. 8, an "I" shaped flex coupler 804 connects the two center portions of the U shaped spring flexures 802. Another I shaped flex coupler 804 does a similar job for the bottom side of the stage 801 supporting the stage on the base 803. These flex couplers 804 substantially improve the off-axis performance of the sensors.

Figure 9:
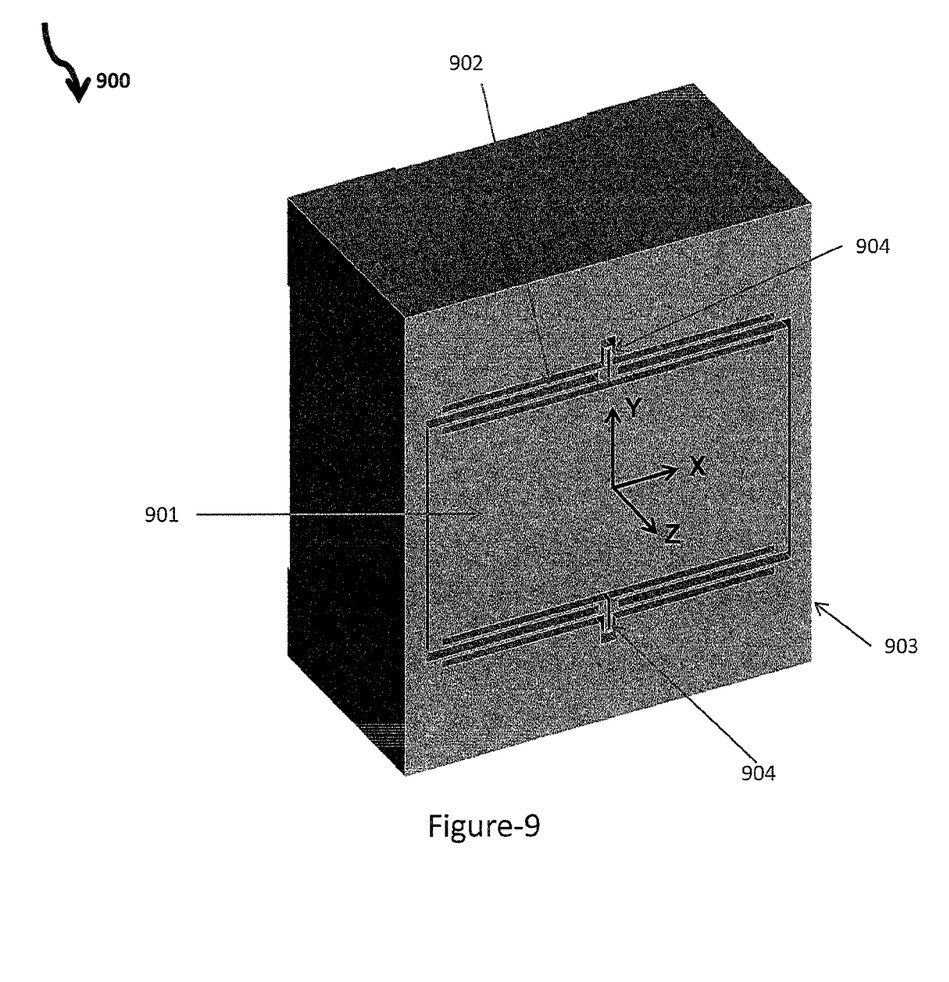
FIG. 9 illustrates a three dimensional view of an embodiment of the disclosure that uses U shaped flex couplers with the U shaped spring flexures.

FIG. 9 illustrates a three dimensional view of a system 900, according to an embodiment of the disclosure. As shown in FIG. 9, the system includes four U-shaped spring flexures 902 with an integrated stage 901 and base 903. The two flex couplers 904 (one in the top and one in the bottom of the stage 901) are machined as an integral part of the stage 901 and out and back couplers 904 providing a monolithic integrated structure having a depth that can be extended all the way through the base 903 along the Z axis. The system 900 unit has excellent off-axis performance while providing linear spring characteristics along the direction of sensing (Y axis).

Figure 10A:
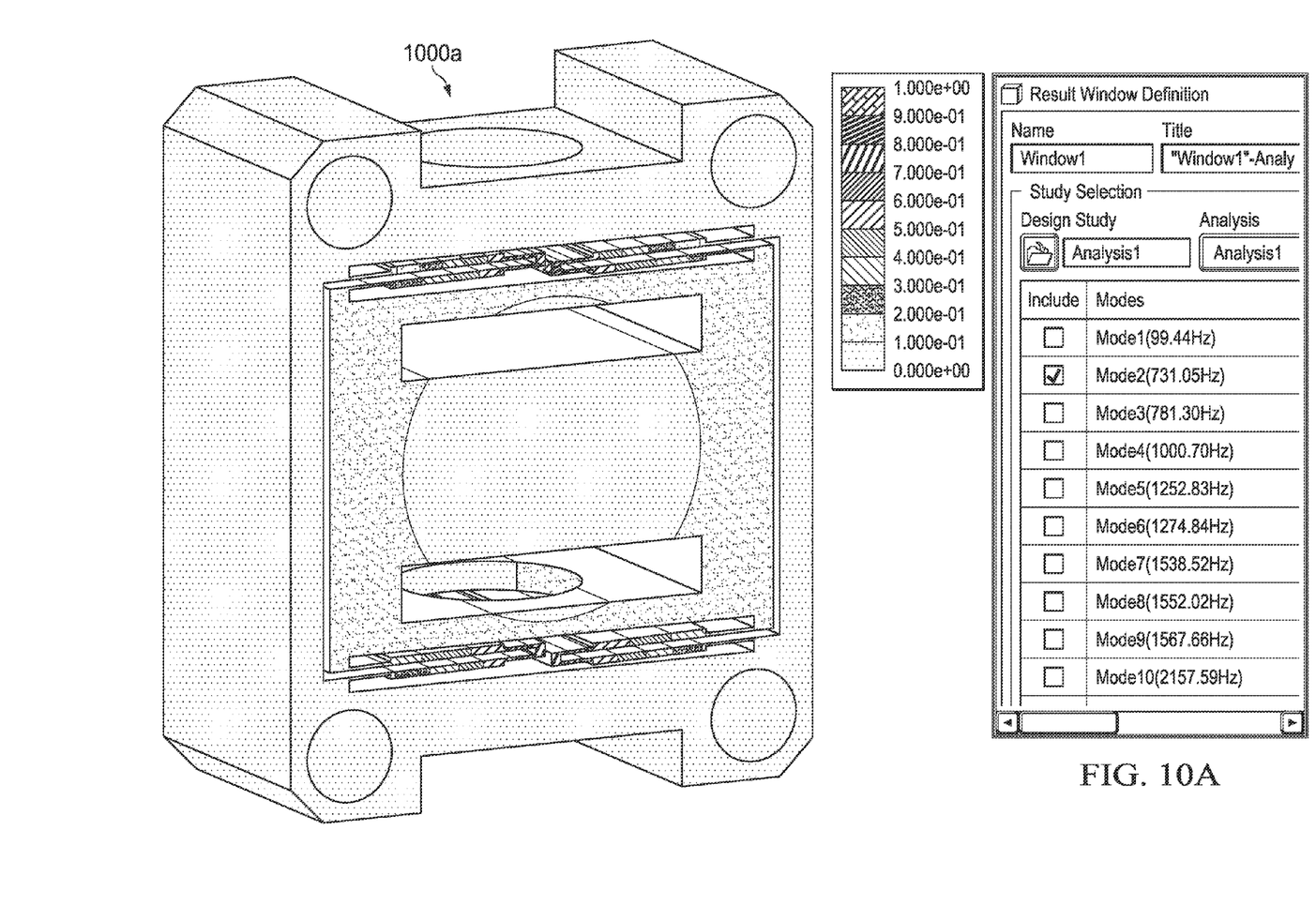
FIGS. 10A and 10B illustrate the significant performance improvements gained by the use of flex couplers compared to flexure systems that do not use flex couplers.
Figure 10B:
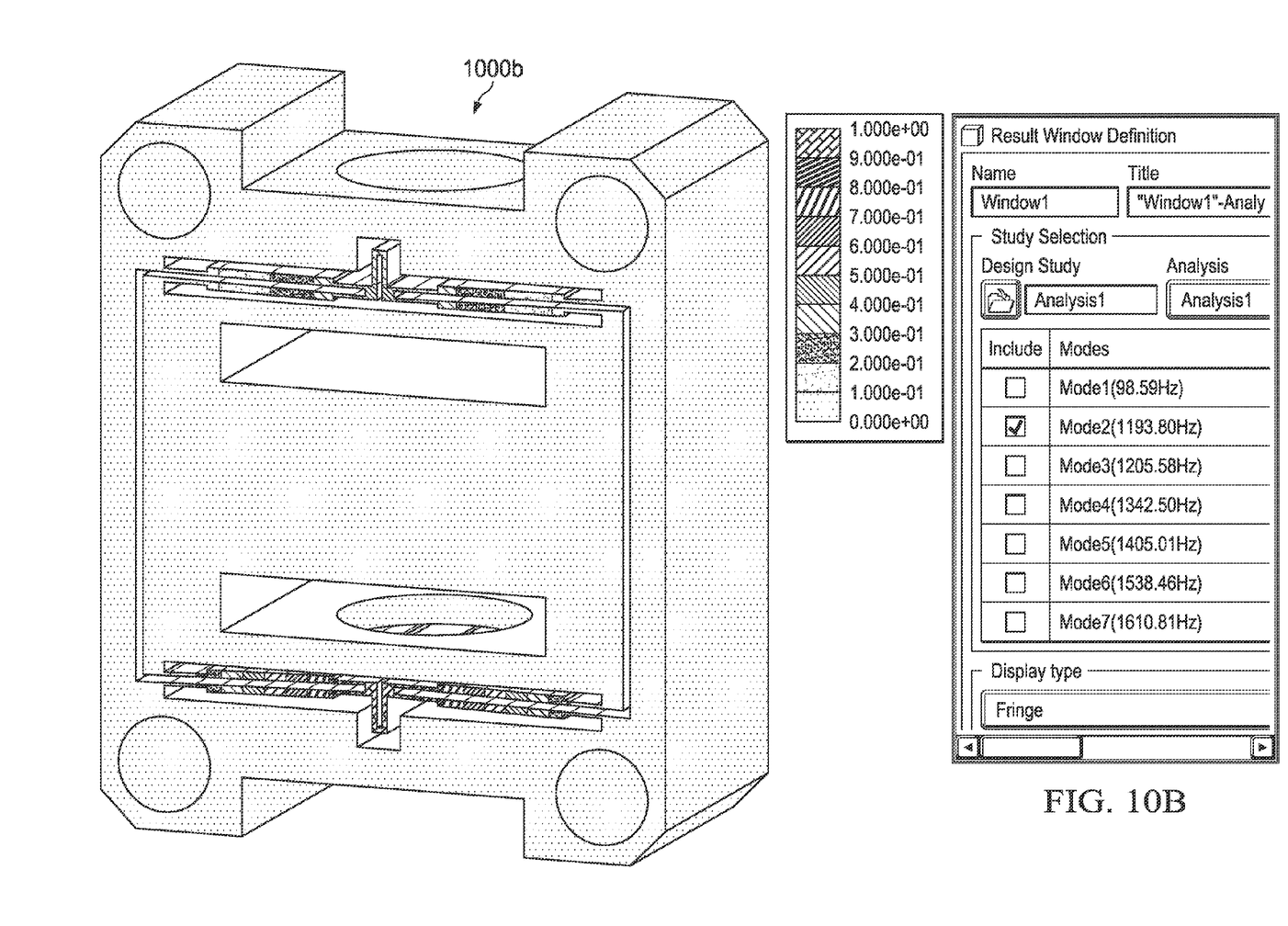

FIGS. 10A and 10B illustrate via simulations 1090a and 1090b a comparison of performance characteristics with and without the flex couplers. In FIG. 10A, the simulation 1090a has a sensor that is mounted on the stage using the two rectangular cut outs in the stage shown for mounting. It uses out-and-back U shaped spring flexures with varying thickness and without any flex coupler—two spring flexures on the top and two at the bottom supporting the stage.

In FIG. 10B, the simulation uses flexures and flex couplers that very in thickness. The thickness of flexures and flex couplers can be varied and designed to a thickness profile to improve performance. The thickness profile of the flexures and flex couplers can be tailored to suite specific sensor performance characteristics (mode frequencies, off-axis forces etc.). An example of this varying thickness profile will be where the flexure blades are thicker in the middle of each blade and thinner at both ends. The simulation shows that the presence of flex couplers (FIG. 10B) substantially shifting the frequencies of higher order modes away from the operational frequencies of interest. This stiffening effect on higher order modes enables operation of the sensors at higher frequencies, thereby increasing the operational bandwidth.

The various embodiments of this disclosure can be used in an accelerometer which utilizes a differential gap measurement of the mass supported by the integral flexures. The supported mass has been verified to have a resonant frequency in the desired linear degree of freedom of 100 Hz, while keeping the next lowest resonant frequency at around 1400 Hz. The flex couplers are shown to increase the off-axis stiffness by a factor of four, increase the resonant frequency of undesirable modes by a factor of two, thereby increasing the servo bandwidth of any servo that may couple with these modes by a factor of two.

In the case of an accelerometer application, off-axis stiffness is critical to preserving the ability to calibrate the sensor to meet the stringent requirements for the viability for a differential gap accelerometers. The combination of improved off-axis stiffness, while preserving linearity in motion and spring rates help facilitate calibration and improved performance.

For material selection for the spring flexures and flex couplers, most materials and alloys that are used to make springs can be used. More common metals include steel, titanium and beryllium copper. Even plastics or other materials used to make springs can be used to make the flexures and couplers.

One has to pay particular attention to the dimensions and aspect ratios of the flexures and couplers for these high end sensors. The thickness of the linear spring flexures should be a small fraction of the total width of the flexures, with a ratio of width to thickness of at least 10 to 1, preferably greater than 40 to one. For relatively small linear stages such as six inches or less in total size, the linear spring flexures can have a thickness in the range of 0.001" and 0.030".

The thickness of the flex couplers should be as thin as possible, generally thinner than the corresponding spring flexures. The flex couplers do not carry the load of the stage like the spring flexures do and their mass should be reduced. For relatively small linear stages that are under 6" in total size, the flex couplers can have a thickness ranging between 0.0005" and 0.010". The thickness and aspect ratio of the spring flexures and flex couplers must be tuned based on the type of application for these sensors and the characteristics of the stage that carry the sensors.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A high performance motion sensing system comprising:
   a stage configured to have a sensor mounted thereon, the stage configured to move in a direction of sensing;
   a body that is fixed and configured to serve as a reference base for the sensor;
   multiple spring flexures that connect the stage to the body, each spring flexure having a U or V shape with a center portion; and
   one or more flex couplers that each connects the center portions of a pair of the spring flexures to restrain off-axis movements of the stage while providing for a linear motion along the direction of sensing.

2. The system of claim 1, wherein the spring flexures are co-planar with the linear motion and the direction of sensing.

3. The system of claim 1, wherein each of the one or more flex couplers has a U or V shape.

4. The system of claim 1, wherein:
   the stage is rectangular and has first and second sides that are perpendicular to the direction of sensing;
   the spring flexures include a pair of out-and-back flexures connecting each of the first and second sides of the stage to the body; and
   the center portions of each pair of out-and-back flexures are connected by one of the one or more flex couplers.

5. The system of claim 1, wherein each of the one or more flex couplers has a U shape, a V shape, a Z shape, or an I shape.

6. The system of claim 1, wherein each of the spring flexures has a flexure width and a flexure thickness, where the flexure width is at least 10 times the flexure thickness.

7. The system of claim 1, wherein one or more of the spring flexures have a varying thickness profile.

8. The system of claim 1, wherein the one or more flex couplers have a varying thickness profile.

9. The system of claim 1, wherein each of the spring flexures has a flexure thickness in a range between 0.001" and 0.030".

10. The system of claim 1, wherein the one or more flex couplers have a coupler thickness, the spring flexures have a flexure thickness, and the coupler thickness is smaller than the flexure thickness.

11. The system of claim 1, wherein each of the one or more flex couplers has a thickness in a range between 0.0005" and 0.010".

12. The system of claim 1, wherein the one or more flex couplers are formed from one or more of: steel, an alloy of steel, titanium, beryllium copper, or plastic.

13. A method comprising:
    mounting a sensor on a stage configured to move in a direction of sensing;
    connecting the stage to a body that is fixed and that is configured to serve as a reference base for the sensor, the stage connected to the body using multiple spring flexures, each spring flexure having a U or V shape with a center portion; and
    connecting the center portions of the spring flexures with one or more flex couplers so as to restrain off-axis movements of the stage while providing for a linear motion along the direction of sensing.

14. The method of claim 13, wherein the spring flexures include out-and-back flexures.

15. The method of claim 14, wherein the center portions of the out-and-back flexures are connected using the one or more flex couplers.

16. The method of claim 13, wherein:
- the stage is rectangular and has first and second sides that are perpendicular to the direction of sensing;
- the spring flexures include a pair of out-and-back flexures connecting each of the first and second sides of the stage to the body; and
- the center portions of each pair of out-and-back flexures are connected by one of the one or more flex couplers.

17. The method of claim 13, wherein each of the one or more flex couplers has a U shape, a V shape, a Z shape, or an I shape.

18. The method of claim 17, wherein the one or more flex couplers have a non-uniform thickness profile.

19. The method of claim 13, wherein one or more of the spring flexures have a non-uniform thickness profile.

20. The method of claim 13, wherein each of the spring flexures has a flexure width and a flexure thickness, where the flexure width is at least 10 times the flexure thickness.

21. The method of claim 20, wherein, for each of the spring flexures, the flexure width is more than 40 times the flexure thickness.

22. The method of claim 13, wherein each of the spring flexures has a flexure thickness in a range between 0.001" and 0.030".

23. The method of claim 13, wherein the one or more flex couplers have a coupler thickness the spring flexures have a flexure thickness, and the coupler thickness is smaller than the flexure thickness.

24. The method of claim 13, wherein each of the one or more flex couplers has a thickness in a range between 0.0005" and 0.010".

25. The method of claim 13, wherein the one or more flex couplers are formed from one or more of: steel, an alloy of steel, titanium, beryllium copper, or plastic.

26. A system comprising:
- a sensor;
- a stage on which the sensor is mounted, the stage configured to move in a direction of sensing;
- a body configured to serve as a reference base for the sensor;
- multiple spring flexures that connect the stage to the body, each spring flexure having a U or V shape with a center portion; and
- one or more flex couplers that each connects the center portions of a pair of the spring flexures to restrain off-axis movements of the stage while providing for a linear motion along the direction of sensing.

* * * * *